United States Patent [19]

Takagi

[11] Patent Number: 5,431,379
[45] Date of Patent: Jul. 11, 1995

[54] METHOD OF INTERCONNECTING AN INPUT SHAFT AND A TORSION BAR OF STEERING MECHANISM AND A TORSION BAR THEREFORE

[75] Inventor: Toshio Takagi, Nagoya, Japan

[73] Assignee: TRW Steering Systems Japan Co., Ltd., Aichi, Japan

[21] Appl. No.: 246,095

[22] Filed: May 19, 1994

[30] Foreign Application Priority Data

May 25, 1993 [JP] Japan .................. 5-122930

[51] Int. Cl.⁶ .................. B65D 39/12; B60G 11/18
[52] U.S. Cl. .................. 267/273; 29/507; 29/523; 403/281; 403/282; 403/315
[58] Field of Search .................. 403/277, 281, 282, 315; 29/507, 512, 513, 523; 180/149; 267/273

[56] References Cited

U.S. PATENT DOCUMENTS

| | | | |
|---|---|---|---|
| 1,979,686 | 11/1934 | Hall et al. | 29/512 |
| 2,554,078 | 5/1951 | Werner | 29/513 |
| 5,078,294 | 1/1992 | Staubli | 29/522.1 X |

FOREIGN PATENT DOCUMENTS

| | | | |
|---|---|---|---|
| 176274 | 7/1991 | Japan | 180/149 |
| 665358 | 1/1952 | United Kingdom | 29/523 |

*Primary Examiner*—Robert J. Oberleitner
*Assistant Examiner*—Kevin D. Rutherford
*Attorney, Agent, or Firm*—Tarolli, Sundheim & Covell

[57] ABSTRACT

A method for fastening an input shaft and a torsion bar together in a power steering mechanism, and the associated torsion bar. A ball-receiving hole is bored in the end of the torsion bar. The end of the torsion bar is inserted into a bore in the input shaft and a ball is pressed into the hole to provide an interference fit between the shaft and the bar. Subsequently, the peripheral edge of the hole in the torsion bar is elliptically deformed so as to retain the ball in the hole and the bar in the shaft. Since a portion of the opening is slightly diametrically broadened by the ball, the periphery of the portion closely contacts the inner wall of the input shaft, thereby strengthening the connection between the torsion bar and the input shaft.

2 Claims, 5 Drawing Sheets

METHOD OF INTERCONNECTING AN INPUT SHAFT AND A TORSION BAR OF STEERING MECHANISM AND A TORSION BAR THEREFORE

FIELD OF THE INVENTION

This invention relates to a method of interconnecting an input shaft and a torsion bar in a power steering mechanism and further relates to a torsion bar suitable for the method.

BACKGROUND OF THE INVENTION

As shown in FIG. 4, a prior-art power steering mechanism is provided with an input shaft 101 rotatable in response to the turning of a steering wheel (not-shown), an output shaft 105 connected by a torsion bar 103 to the input shaft 101, and a control valve 107 composed of valve members provided on the peripheries of the input and output shafts 101 and 105. When the input shaft 101 is rotated, the control valve 107 is operated to control the supply and discharge of pressurized hydraulic fluid. In the prior-art power steering mechanism, as shown in FIG. 4, the lower end 103a of the torsion bar 103 is an interference fit into the output shaft 105, while the upper end 103b of the torsion bar 103 is inserted into the input shaft 101. By driving a pin 115 into holes 111 and 113 formed in the input shaft 101 and the upper end 103b of the torsion bar 103, respectively, the input shaft 101 and the torsion bar 103 are fastened together.

The precision required in processing the pin holes 111 and 113 is difficult to attain. When the holes 111 and 113 are bored and the pin 115 is driven into the holes 111,113, the input shaft 101 and the torsion bar 103 are easily displaced in the rotational direction due to imprecise machining of the pin holes 111 and 113. Since the input shaft 101 and the torsion bar 103 are difficult to secure in a desired relative position, unsatisfactory articles easily result from the prior art.

SUMMARY OF THE INVENTION

Wherefore, an object of this invention is to provide a method of fastening an input shaft and a torsion bar together in a power steering mechanism, and to provide a torsion bar suitable for practicing the method, in which a lesser degree of processing precision is demanded than in the prior art.

To attain this or other objects, the present invention provides a method of fastening an input shaft and a torsion bar together in a steering mechanism by press-fitting one end of the torsion bar into an output shaft and passing the other end of the torsion bar into the input shaft. A hole is formed in the axial center of the end of the torsion bar proximal to the input shaft. A spherical member having a larger outer diameter than the inner diameter of the hole is press-fit into the hole, to broaden the end of the torsion bar. Broadening the end of the torsion bar causes the external diameter of the end of the torsion bar proximal to the input shaft to expand within the input shaft, thereby longitudinally and rotatably connecting the torsion bar to the input shaft in a desired orientation relative to each other with a tight friction fit. After the torsion bar is connected to the input shaft, the edge of the peripheral wall of the hole is broadened along a first axis that is perpendicular to the longitudinal axis of the torsion bar, thereby holding the spherical member inside and even more securely connecting the input shaft and the torsion bar in the connected position.

Slits can be formed in the peripheral wall of the hole in the torsion bar to aid in broadening the edge of the peripheral wall. Alternatively, the peripheral wall of the hole can be relatively made thin, likewise aiding in broadening the edge of the wall.

According to the fastening method of the present invention, the torsion bar and the input shaft are connected to each other by press-fitting a ball into the hole in the torsion bar, thereby obviating the need for pins or pin holes. The ball receiving hole has an inner diameter that is smaller than the outer diameter of the ball. Since a significantly lower degree of processing precision is demanded for the formation of the hole than in the prior art, the hole can be relatively easily and inexpensively bored. After the ball is press-fitted into the hole, the edge of the peripheral wall of the hole in the torsion bar can be easily broadened in a first direction perpendicular to the longitudinal axis of the torsion bar. The input shaft is thereby secured in its connected position in a fail-safe manner.

When the edge of the peripheral wall of the ball hole is continuous and it is deformed outwardly in a first direction, the wall is resultingly narrowed in a second direction perpendicular to both the longitudinal axis and the first direction. The narrowed portion of the edge of the peripheral wall reclaims the ball in the hole. The ball is also held inside the hole, because the broadened portion of the hole is slightly narrowed toward the position distal from the opening. Conversely, the narrowed portion of the hole is diametrically broadened toward the position distal from the opening, thereby securing the connection of the torsion bar with the input shaft.

To obtain the aforementioned advantage, the edge of the peripheral wall of the ball hole can be deformed in just the first direction.

When the peripheral wall of the hole in the torsion bar has slits, the edge of the peripheral wall of the ball hole, with the ball already received therein, can be easily broadened in the first direction. Even if the entire end of the peripheral wall is circumferentially expanded, the roots of the tabs between the slits are bent inwardly, thereby preventing the ball from dropping out of the hole. Alternatively, the peripheral wall can be alternately broadened in one direction and narrowed in the other direction.

BRIEF DESCRIPTION OF THE DRAWINGS

The invention will now be described, by way of example, with reference to the accompanying drawings, in which.

DETAILED DESCRIPTION OF THE PREFERRED EMBODIMENTS

Figure 1A:
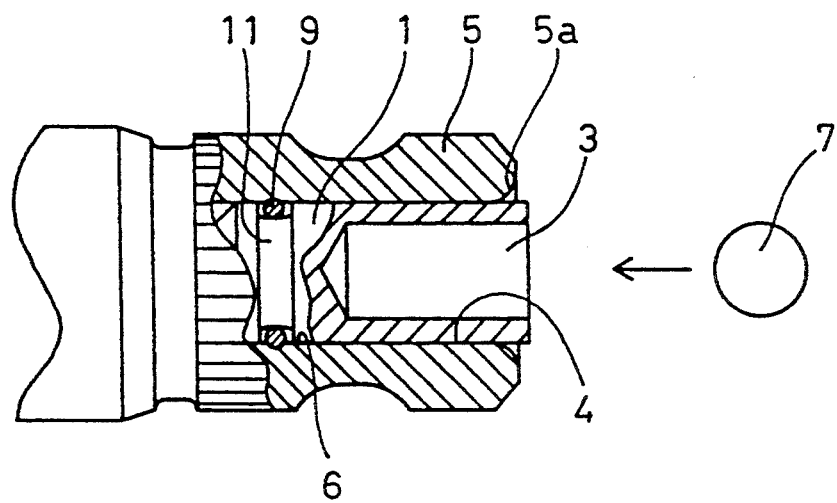
FIGS. 1A, 1B and 1C are explanatory views of the first embodiment.
Figure 1B:
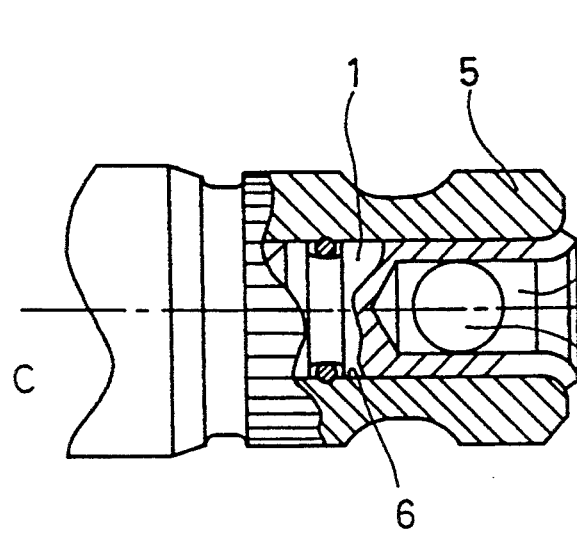
Figure 1C:
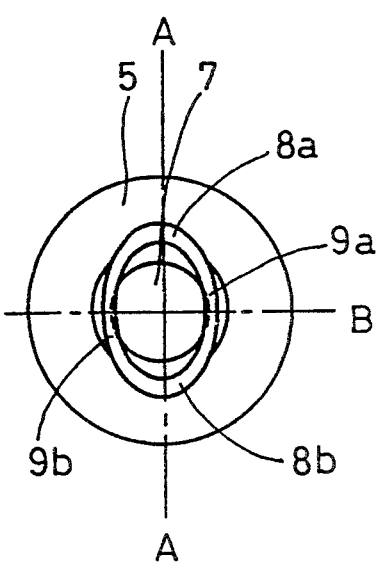

In a hydraulic power steering mechanism according to a first embodiment, as shown in FIG. 1A, the end of a torsion bar 1 to be connected to an input shaft 5 is provided with an axial hole 3 for receiving a ball 7, while the other end of the torsion bar 1 is press-fit in an output shaft. After the end of the torsion bar 1 having the hole 3 is inserted into a longitudinal bore 6 that extends the entire length of the input shaft 5, the ball 7 is pressed into the hole 3. The diameter of the ball 7 is larger than the inner diameter of the hole 3. Thus, when the ball 7 is pressed into the hole 3, the end of the torsion bar 1 forming the peripheral wall of the hole 3 is deformed, expanding the outer diameter of the end of the torsion bar 1 within the longitudinal bore 6 and thereby connecting the torsion bar 1 to the input shaft 5 in an interference fit. Subsequently, as shown in FIGS. 1B and 1C, the edge of the hole 3 is deformed into an elliptical contour by deforming diametrically opposite edges 8a and 8b of the hole 3 outward, away from the longitudinal axis in a first direction along a first axis A that is perpendicular to the longitudinal axis. As shown in FIG. 1A, the end of the torsion bar 1 adjacent the input shaft 5 is also provided with an annular groove 11 for receiving an O-ring 9 to form a seal between the torsion bar 1 and the input shaft 5.

Elliptical deformation is easier and requires less force than broadening the entire peripheral edge of the hole 3. By deforming diametrically opposed edges 8a and 8b of the opening 3 outwardly in the first direction, edges 8a and 8b partially curl over a curved lip 5a on the end of the longitudinal bore 6 in the input shaft 5, as shown in FIG. 1B. After deformation, the outer periphery of the deformed end of the torsion bar 1 along the first axis A is larger than the internal diameter of the longitudinal bore 6. Thus, the torsion bar 1 is positively held within the input shaft 5 by the enlarged portions 8a and 8b of the edge of the hole 3 which can no longer pass through the bore 6 in the input shaft 5. Furthermore, pressing the opposed edges 8a and 8b of the hole 3 outward causes the outer periphery of the torsion bar 1 to press against the internal wall of the bore 6 in the input shaft 5, increasing the friction fit therebetween.

When edges 8a and 8b are deformed outwardly, diametrically opposite edges 9a and 9b deform inward, towards the longitudinal axis, in a second direction along an axis B that is perpendicular the both axis A and the longitudinal axis, thereby decreasing the inner dimensions of the opening 3 along axis B, as shown in FIG. 1B. In this manner, the ball 7 is partially enclosed within hole 3 and positively held therein in a fail-safe manner.

Figures 2A, 2B:
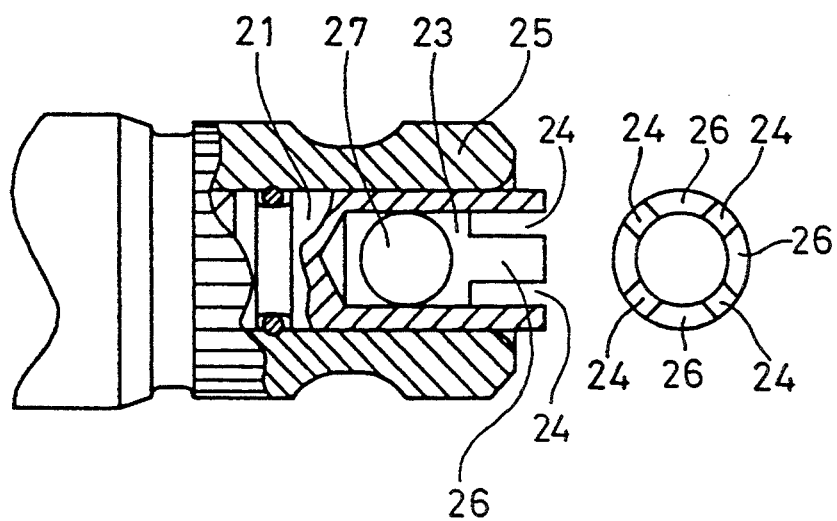
FIGS. 2A and 2B are explanatory views of the second embodiment.

In the second embodiment, as shown in FIGS. 2A and 2B, slits 24 are formed in the peripheral wall of a hole 23 for receiving a ball 27 in a torsion bar 21 defining tabs 26 therebetween. After the ball 27 is press-fit into the hole 23, the tabs 26 around the edge of the hole 23 can be easily broadened aided by the presence of the slits 24. If all of the tabs 26 are bent outwards, the roots of the tabs 26 bend inwardly, thereby preventing the ball 7 from dropping out of the hole 3. Optionally, the tabs 26 can be alternately bent outwardly, forming an interference fit between the torsion bar 1 and the input shaft 5, and bent inwardly, preventing the ball from dropping out of the hole 3.

Figure 3:
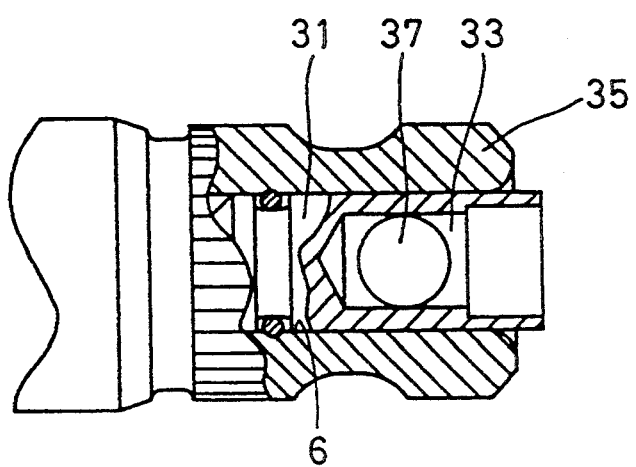
FIG. 3 is an explanatory view of the third embodiment.
Figure 4:
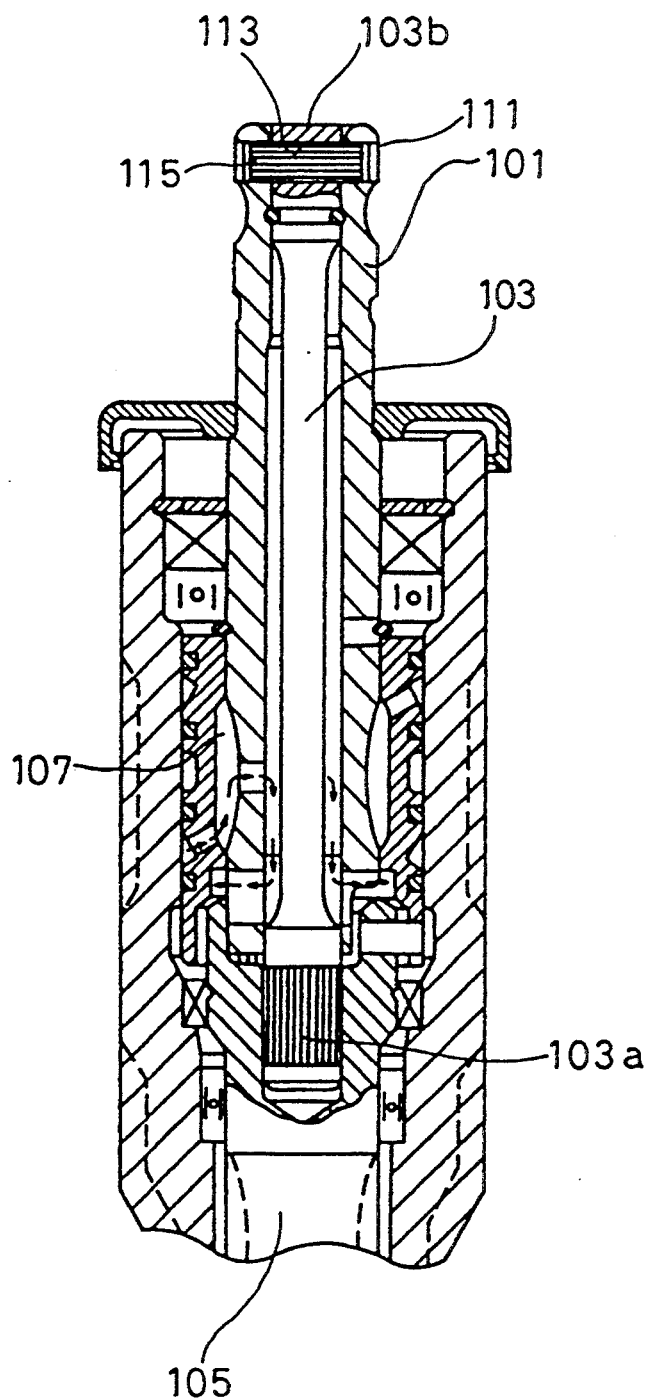
FIG. 4 is an explanatory view of a prior-art method for fastening a torsion bar and an input shaft.

In the third embodiment, as shown in FIG. 3, the peripheral wall of a ball-receiving hole 33 in the end of a torsion bar 31 to be connected to an input shaft 35 is relatively thin by comparison with the wall thickness defining the hole 33. After a ball 37 is pressed into the hole 33, the edge of the hole 33 can be easily broadened, because the wall is sufficiently thin.

This invention has been described above with reference to the preferred embodiment as shown in the figures.

one Modifications and alterations may become apparent to skilled in the art upon reading and understanding the specification. Despite the use of the embodiment for illustration purposes, the invention is intended to include all such modifications and alterations within the spirit and scope of the appended claims.

In this spirit, the direction in which the peripheral edges of the holes 23 and 33 formed in the torsion bars 21 and 31, respectively, are deformed is not limited to one specified direction. The peripheral edges can be circumferentially broadened out and, if desired, narrowed in.

What is claimed is:

1. A method of fastening an input shaft and a torsion bar, having coincident longitudinal axes, comprising the steps of:
   a) providing a torsion bar having an axially extending bore in a first end thereof;
   b) inserting said first end of the torsion bar into an axial bore extending longitudinally in the input shaft;
   c) providing a spherical member having an outer diameter that is larger than a diameter of the axial bore in the torsion bar;
   d) pressing said spherical member into said bore in the torsion bar to expand said first end of the torsion bar within said input shaft to provide an interference fit connection of said torsion bar to said input shaft; and
   e) expanding the rim of said bore in the torsion bar by pressing diametrically opposite rim portions of said hole outward away from said longitudinal axes rim to deform the rim of the opening into an elliptical contour to secure said torsion bar within said input shaft and said spherical member within said bore of the torsion bar.

2. A mechanism comprising:
   a torsion bar having first and second ends, said first end of said torsion bar having a hole in the axial center thereof, said hole having a peripheral wall that forms said first end of said torsion bar and defines said hole;
   an input shaft for connection to said first end of said torsion bar and having a bore extending longitudinally therethrough, said second end of said torsion bar being inserted into said bore for connection to an output shaft; and
   a spherical member having an outer diameter that is larger than an inner diameter of said hole in said end of said torsion bar, said spherical member being press fit into said hole broadening said peripheral wall of said hole frictionally connecting said torsion bar to said input shaft;
   a first pair of diametrically opposite portions of said edge of said peripheral wall being curved outward away from a longitudinal axis of said torsion bar in a first direction perpendicular to the longitudinal axis into engagement with an inner surface of said bore connecting said torsion bar to said input shaft and a second pair diametrically opposite portions of said edge being curved inward toward the longitudinal axis in a second direction perpendicular to both the longitudinal axis and the second direction positively securing said spherical member in said hole.

* * * * *